United States Patent
Haag et al.

(10) Patent No.: US 10,186,729 B2
(45) Date of Patent: Jan. 22, 2019

(54) BATTERY CELL COMPRESSION METHOD AND ASSEMBLY

(71) Applicant: Ford Global Technologies, LLC, Dearborn, MI (US)

(72) Inventors: Jeffrey Matthew Haag, Dearborn, MI (US); Eid Farha, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 15/462,006

(22) Filed: Mar. 17, 2017

(65) Prior Publication Data

US 2018/0269518 A1 Sep. 20, 2018

(51) Int. Cl.
*H01M 2/02* (2006.01)
*H01M 2/10* (2006.01)
*H01M 10/04* (2006.01)

(52) U.S. Cl.
CPC ..... *H01M 10/0481* (2013.01); *H01M 2/0262* (2013.01); *H01M 2/0267* (2013.01); *H01M 2/1077* (2013.01); *H01M 2220/20* (2013.01)

(58) Field of Classification Search
CPC .......... H01M 10/0481; H01M 2/0267; H01M 2/1077; H01M 2/0262
See application file for complete search history.

(56) References Cited

U.S. PATENT DOCUMENTS

| | | | | |
|---|---|---|---|---|
| 2014/0045037 A1* | 2/2014 | Nishikawa | .......... | H01M 2/0267 429/156 |
| 2014/0141338 A1* | 5/2014 | Kim | .................. | H01M 10/0431 429/246 |
| 2015/0037662 A1* | 2/2015 | Pinon | .................. | H01M 2/0237 429/179 |
| 2015/0147638 A1* | 5/2015 | Tamura | ............... | H01M 2/0277 429/179 |
| 2015/0188198 A1* | 7/2015 | Bonhomme | .......... | H01M 10/48 429/61 |
| 2015/0243938 A1* | 8/2015 | Kim | ..................... | H01M 2/0217 429/185 |
| 2015/0318570 A1* | 11/2015 | Choi | ................. | H01M 10/0565 429/144 |
| 2015/0349302 A1 | 12/2015 | Baek et al. | | |
| 2016/0126583 A1* | 5/2016 | Kato | ................... | H01M 10/049 429/185 |
| 2016/0190531 A1 | 6/2016 | Neuberger et al. | | |
| 2016/0285061 A1* | 9/2016 | Reinshagen | ........ | H01M 2/1077 |

FOREIGN PATENT DOCUMENTS

| | | |
|---|---|---|
| DE | 102013217903 | 3/2015 |
| DE | 102014204737 | 9/2015 |
| DE | 102014219644 | 3/2016 |

OTHER PUBLICATIONS

Robopac, Vertical Stretch Wrapping Machine, Robopac USA, retrieved from http://www.robopac.com/US/Products/Vertical_stretch_wrapping_machines on Jan. 13, 2017.

\* cited by examiner

*Primary Examiner* — Stewart A Fraser
(74) *Attorney, Agent, or Firm* — Carlson, Gaskey & Olds, P.C.

(57) ABSTRACT

An exemplary method includes, among other things, winding a curable material at least partially about a plurality of battery cells that are compressed by a fixture. An exemplary assembly includes, among other things, a plurality of battery cells compressed by a fixture, and a curable material wound around the plurality of battery cells.

20 Claims, 6 Drawing Sheets

BATTERY CELL COMPRESSION METHOD AND ASSEMBLY

TECHNICAL FIELD

This disclosure relates generally to a battery array and, more particularly, to a curable material at least partially wound around battery cells of the battery array.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A traction battery pack of an electrified vehicle can include one or more battery arrays. Plates, such as end plates and side plates, are positioned about the battery cells of the arrays. Tensioning rods, or other bracing features, pull opposing plates together to compress the battery cells, which can expand over time. The plates are typically metal.

SUMMARY

A method according to an exemplary aspect of the present disclosure includes, among other things, winding a curable material at least partially about a plurality of battery cells that are compressed by a fixture.

In a further non-limiting embodiment of the foregoing method, the method includes, after the curable material has cured, holding the plurality of battery cells in a compressed position using the curable material rather than the fixture.

A further non-limiting embodiment of any of the foregoing methods includes winding the curable material about an entire circumferential perimeter of the plurality of battery cells.

A further non-limiting embodiment of any of the foregoing methods includes compressing the plurality of battery cells prior to the winding by moving a first plate toward a second plate using the fixture. The plurality of battery cells are positioned between the first and second plates.

In a further non-limiting embodiment of any of the foregoing methods, the fixture is coupled to the first and the second plate when the fixture is compressing the plurality of battery cells, and is decoupled from the first plate and the second plate after the curable material has cured.

In a further non-limiting embodiment of any of the foregoing methods, the fixture is coupled to respective coupling surfaces of the first and the second plate when the fixture is coupled to the first and the second plate, and the winding includes winding the curable material about winding surfaces of the first and second plate. The winding surfaces are transverse to the coupling surfaces.

A further non-limiting embodiment of any of the foregoing methods includes using an actuator to adjust the fixture to a position where the plurality of battery cells are compressed by the fixture, and decoupling the fixture from the actuator while the plurality of battery cells are compressed by the fixture.

In a further non-limiting embodiment of any of the foregoing methods, the curable material is a fiber-reinforced polymer-based tape.

A further non-limiting embodiment of any of the foregoing methods includes winding the curable material at least three times about a perimeter of the plurality of battery cells.

A further non-limiting embodiment of any of the foregoing methods includes winding the curable material about the plurality of battery cells and about a thermal exchange plate such that the curable material holds the thermal exchange plate relative to the plurality of battery cells after the curable material has cured.

In a further non-limiting embodiment of any of the foregoing methods, the plurality of battery cells are part of a traction battery pack.

In a further non-limiting embodiment of any of the foregoing methods, the winding includes rotating the plurality of battery cells relative to the curable material.

In a further non-limiting embodiment of any of the foregoing methods, the curable material is cured after the winding.

In a further non-limiting embodiment of any of the foregoing methods, a first amount of the curable material is wound about the battery cells to compress the battery cells between first and second plates, and a second amount of the curable material is wound about the battery cells to hold a device relative to the battery cells. The first amount of material is wound about a first axis. The second amount of material is wound about a second axis transverse to the first axis.

An assembly according to an exemplary aspect of the present disclosure includes, among other things, a plurality of battery cells compressed by a fixture, and a curable material wound around the plurality of battery cells.

In a further non-limiting embodiment of the foregoing assembly, the assembly includes a first plate and a second plate. The fixture is coupled to the first and second plates to compress the battery cells between the first and second plates.

In a further non-limiting embodiment of any of the foregoing assemblies, the first plate and the second plate are a polymer-based material.

In a further non-limiting embodiment of any of the foregoing assemblies, the curable material is a tape that fiber-reinforced and polymer-based.

In a further non-limiting embodiment of any of the foregoing assemblies, the curable material includes at least one layer of the tape.

In a further non-limiting embodiment of any of the foregoing assemblies, the plurality of battery cells are part of a traction battery pack.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to winding a curable material around battery cells. The battery cells are compressed as the curable material is wound. The material then cures to hold the battery cells in the compressed position.

Figure 1:
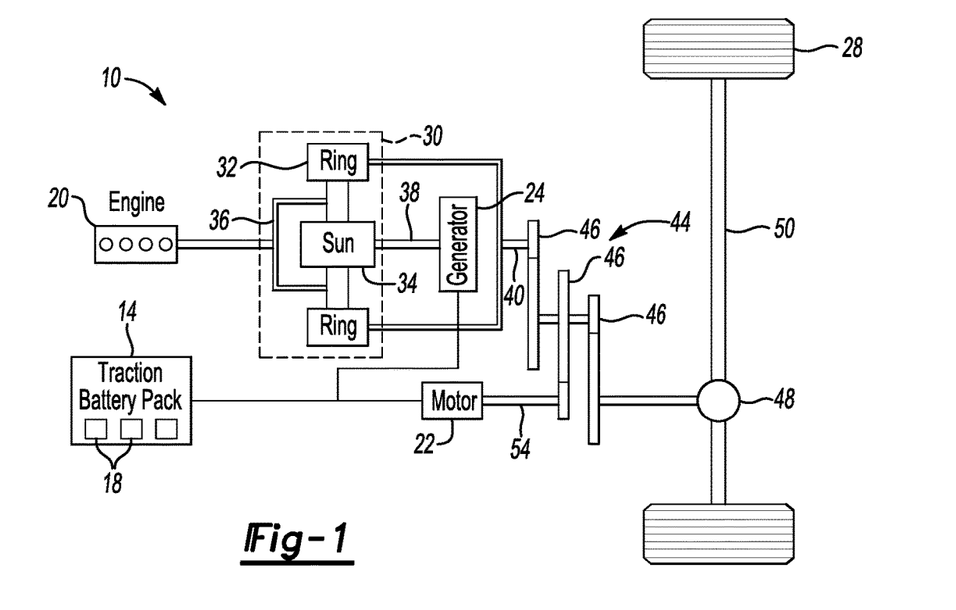
FIG. 1 illustrates a schematic view of an example powertrain of an electrified vehicle.

Referring to FIG. 1, a powertrain 10 of a plug-in hybrid electric vehicle (PHEV) includes a traction battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to traction battery packs and battery arrays in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery pack 14.

Figure 2:
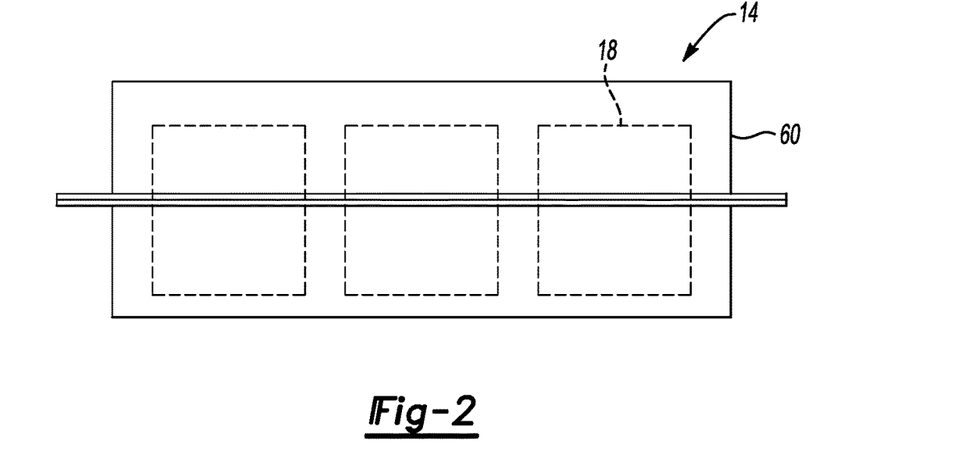
FIG. 2 illustrates a side view of a traction battery pack from the powertrain of FIG. 1.
Figure 3:
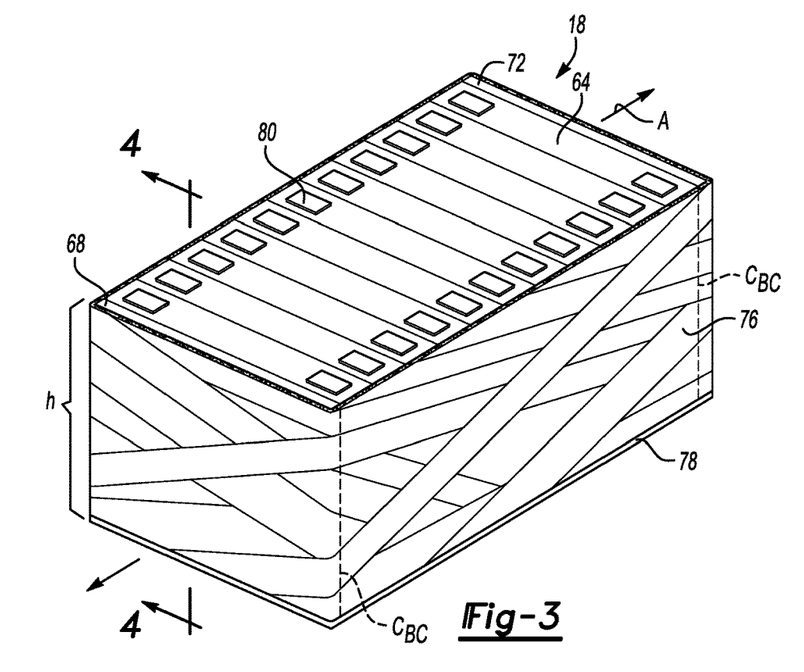
FIG. 3 illustrates a battery array from the traction battery pack of FIG. 2 that incorporates an exemplary compression assembly utilizing a curable material.

Referring now to FIGS. 2 and 3 with continuing reference to FIG. 1, the traction battery pack 14, in an exemplary non-limiting embodiment, includes an enclosure 60 housing three of the battery arrays 18. In other examples, the enclosure 60 could house fewer than three battery arrays 18, or more than three battery arrays 18.

The battery arrays 18 include a plurality of battery cells 64, a first plate 68, a second plate 72, a compression assembly 76, and a base 78. The battery cells 64 are distributed along an axis A. Separators (not shown) could be positioned between axially adjacent battery cells 64 within the battery arrays 18.

The battery cells 64 are lithium ion cells in this example, which, if unconstrained, can expand over time. Specifically, in this example, the battery cells 64 are prismatic cells. In other examples, the battery cells 64 could be pouch type cells, cylindrical cells, or some other type of battery cell.

The first plate 68 is at a first end of the battery cells 64. The second plate 72 is at an opposing, second end of the battery cells 64. The battery cells 64 are compressed axially between the plates 68 and 72. Expansion of the battery cells 64 is thus constrained at each axial end by the plates 68 and 72.

The compression assembly 76 holds the first plate 68 and the second plate 72 axially in a position suitable for compressing the battery cells 64. The compression assembly 76, the first plate 68, the second plate 72, and the battery cells 64 are disposed upon the base 78.

In an exemplary non-limiting embodiment, the base 78 is a thermal exchange plate that communicates a coolant utilized to cool the battery cells 64. The base 78, in this example, is disposed at a vertical bottom of the battery cells 64. Terminals 80 extend from the battery cells 64 at a vertical top opposite the end of the battery cells 64 interfacing with the base 78.

Figure 4:
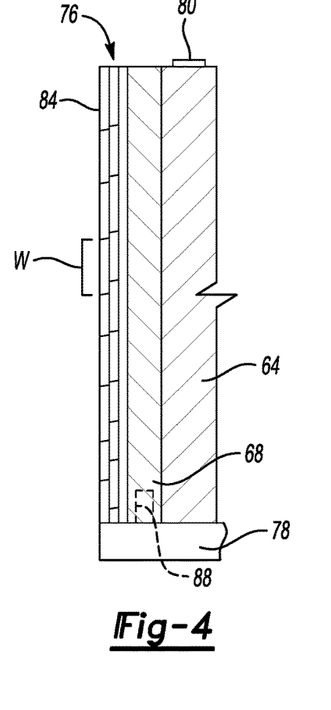
FIG. 4 shows a section view at Line 4-4 in FIG. 3.
Figure 5:
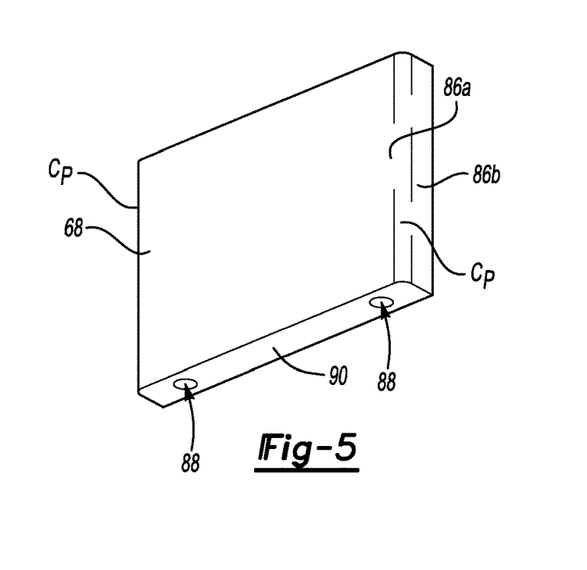
FIG. 5 shows a perspective view of a plate from the battery array of FIG. 3.

Referring now to FIGS. 4-5 with continuing reference to FIG. 3, the compression assembly 76 is a multilayered structure including multiple layers of a curable material. In this exemplary, non-limiting embodiment, the curable material is a fiber reinforced, polymer-based tape 84. The exemplary fiber of the tape 84 could comprise glass filaments or fibers, carbon fibers, aramid fibers, etc., which are distributed within a polymer-based material. The fibers are substantially non-conductive in this example.

The curable material of the compression assembly 76 is cured to a desired state after being positioned about battery cells 64. Some battery cells 64 cannot be stored above certain temperatures, say 60 degrees Celsius. Accordingly, the material of the compression assembly 76 is, in such examples, a material that can cure without requiring its temperature to be elevated to temperatures that could impact the battery cells 64.

In this example, the compression assembly 76 is formed utilizing approximately three layers of the tape 84 wound around the battery cells 64. The number of layers of the tape 84 need not be consistent throughout the compression assembly 76. A portion of the tape 84 could overlap two other layers, and another portion of the tape 84 could overlap three layers for example.

The example tape 84 is wound about an entire circumferential perimeter of the battery cells 64 in this example. The example tape 84 is additionally wound about the plates 68, 72. In particular, the tape 84 interfaces with winding surfaces 86a and 86b of the plates 68, 72. The winding surfaces 86a face in the direction of the axis A. The winding surfaces 86b face laterally away from the axis A.

Winding the tape 84 about the plates 68, 72 at the axial ends of the battery cells 64 distributes the tensioning load from the tape 84 across the plates 68, 72. This can prevent the tape 84 from compressing the battery cells 64 at the axial ends, particularly across the corners $C_{BC}$ of the battery cells 64.

The plates 68, 72, are a metal or metal alloy. In particular, the plates 68, 72 could be extruded aluminum. In another example, the plates 68, 72 are polymer-based, which can provide some weight savings. Corners $C_P$ (FIG. 5) of the plates 68, 72 can have a radius to facilitate bending the tape 84 about the corners $C_P$ without overly stressing an area of the tape 84.

Although the exemplary compression assembly 76 is wound about the battery cells 64 and the plates 68, 72, other exemplary embodiments could include a compression assembly 76 wound about the battery cells 64, but not the plates 68, 72.

After the winding, the tape 84 is permitted to cure. The tape 84, when cured, provides the compression assembly 76, which holds the axial position of the first plate 68 and the second plate 72, and additionally protects the axial ends and laterally facing sides of the battery array 18. When cured, the tape 84 effectively compresses the battery cells 64 so that no tensioning rods or similar bracing features are required.

The tape 84, in this exemplary non-limiting embodiment, has a width W which is less than a height H of the first plate 68, the second plate 72, and the battery cells 64. The tape 84 is thus wound about the outer periphery of the plates 68, 72, and the battery cells 64 multiple times in order to ensure that layers of the tape 84 extend the full height H of the plates 68, 72, and battery cells 64.

Figure 6:
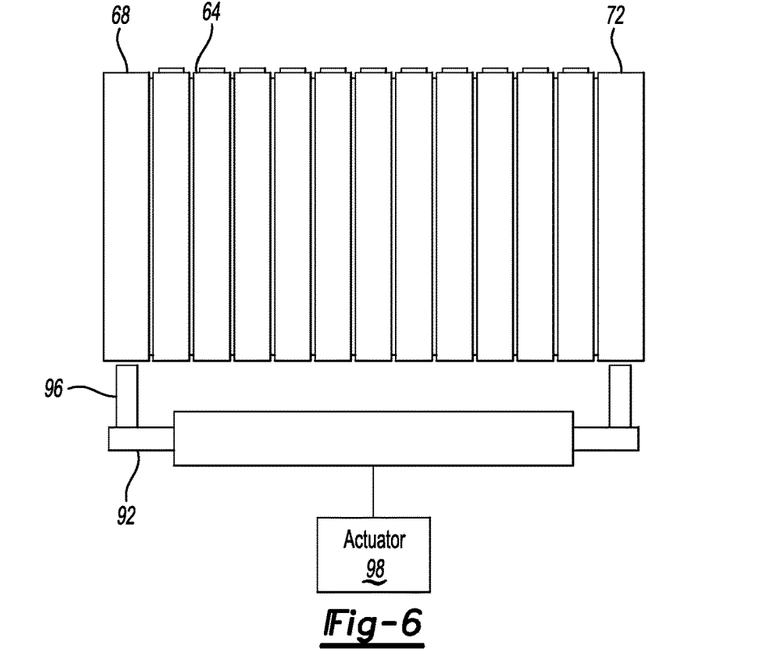
FIG. 6 shows plates of the battery array of FIG. 3 decoupled from a fixture.
Figure 7:
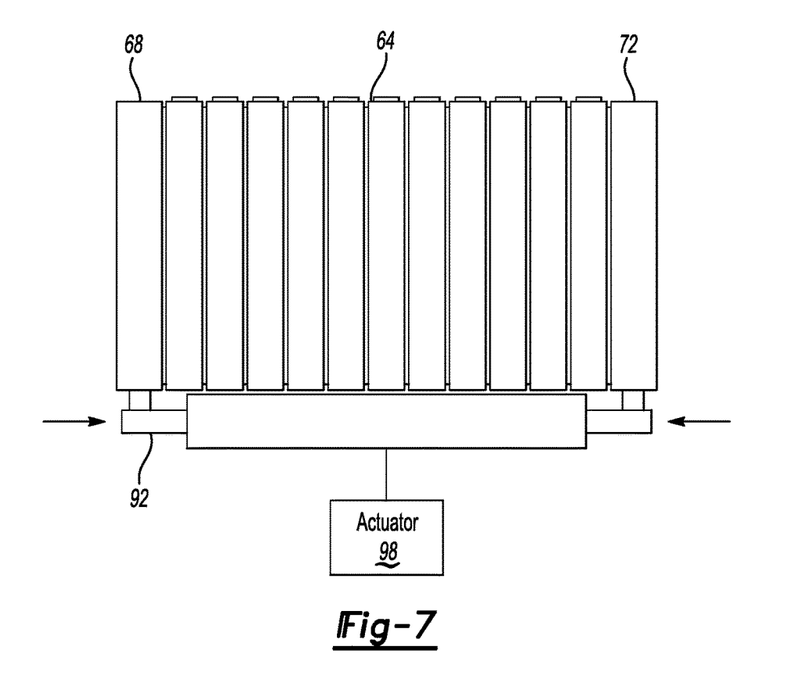
FIG. 7 shows the plates of FIG. 6 coupled to the fixture.

Referring now to FIGS. 6-7, with continuing reference to FIGS. 3-5, the battery cells 64 are compressed axially between the plates 68, 72 as the tape 84 as the tape 84 is applied.

In this example, the plates 68, 72 include a pair of bores 88 opening to a coupling surface 90 of the plates 68, 72. The coupling surface 90 is transverse, and in this example perpendicular, to the winding surfaces 86a and 86b.

The bores 88 provide an interface to couple the plates 68, 72 to a fixture 92. The fixture 92 is used to compress the battery cells 64 along the axis A between the plates 68, 72 so that the tape 84 can be applied with the battery cells 64 in a desired compressed position.

The fixture 92 includes pins 96 received within the bores 88 to couple the plates 68, 72 to the fixture 92. The fixture 92 is removeably mounted upon an actuator 98. The actuator 98 manipulates the pins 96 between positions that are axially closer to each other, and positions that are axially further from each other.

The actuator 98 could have many forms, including, but not limited to, a hydraulic actuator, a pneumatic actuator, or a rack-and-pinion type configuration.

When the fixture 92 is coupled to the plates 68, 72, and mounted to the actuator, the actuator 98 can manipulate the fixture to a position causing the fixture to draw the plates 68, 72 closer together, which compresses the battery cells 64 axially. The fixture 92 can then be locked in the position compressing the battery cells 64 and disengaged from an actuator 98. The battery cells 64, and the plates 68, 72, are then transitioned to a wrapping stage where the curable material is applied that will cure to form the compression assembly 76 of FIG. 3.

Figure 8:
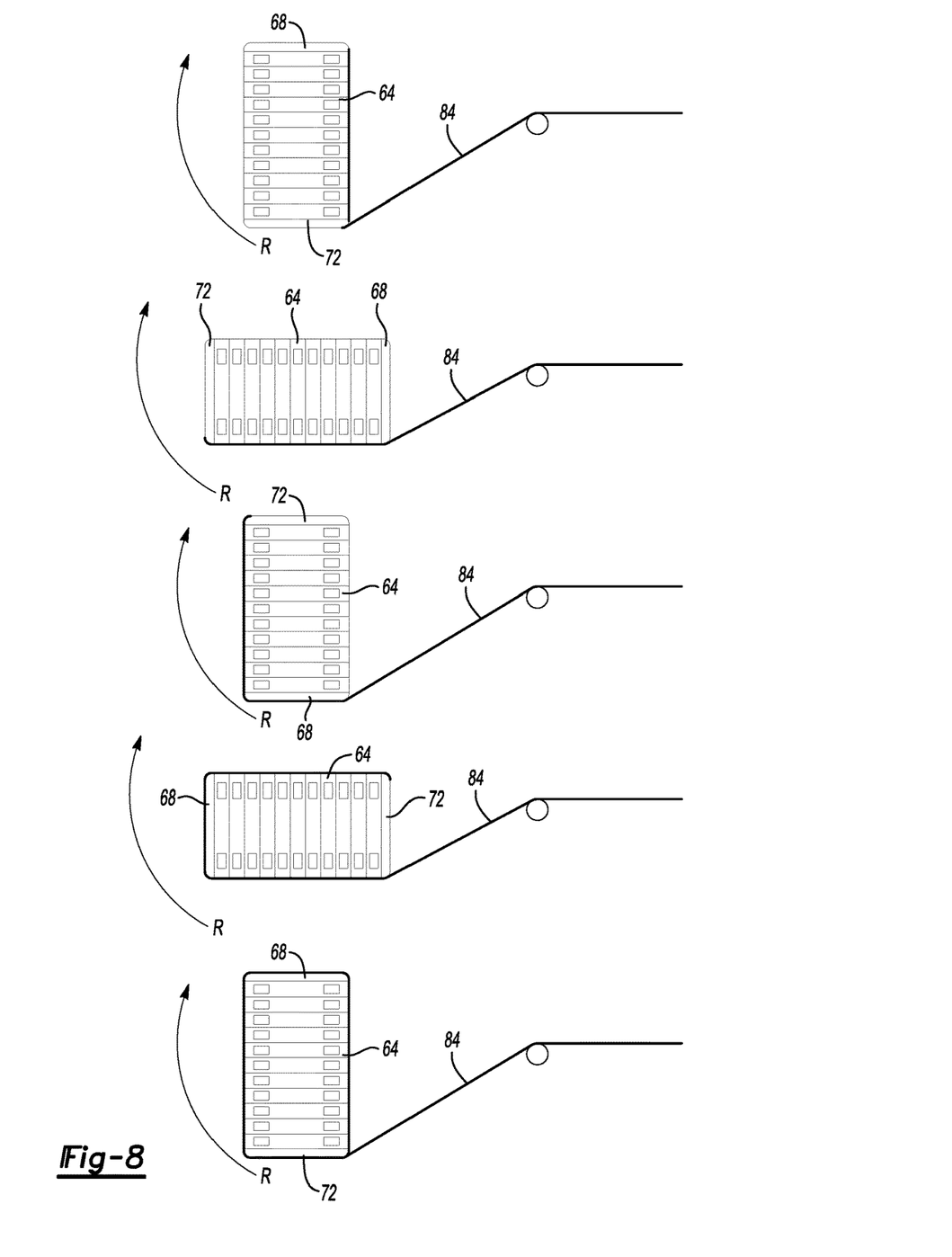
FIG. 8 shows exemplary steps in the process of winding a curable material about the plates and the battery cells of FIG. 7.

Referring to FIG. 8, the battery cells 64 and the plates 68 are compressed axially by the fixture 92, which has been detached from the actuator 98. The fixture 92 thus keeps the battery cells 64 compressed even when the fixture 92 is detached from the actuator 98.

The battery cells 64 with the plates 68, 72 are rotated in a direction R relative to a roll of the tape 84. The battery cells 64 and plates 68, 72 thus act as a mandrel. In another example, the tape 84 can be rotated relative to the battery cells 64 and the plates 68, 72

The rotation in the direction R causes the tape 84 to wrap about the battery cells 64 and the plates 68 and 72. The wrapping of the tape 84 continues until the compression assembly 76 has a desired thickness. Again, the fixture 92 keeps the battery cells 64 and the plates 68, 72 compressed axially during the wrapping.

Notably, the battery cells 64 with the plates 68 and 72 can be tipped relative to the tape 84 as the tape 84 is applied to cause the tape 84 to adhere to the battery cells 64 and the plates 68, 72 at an angle. That is, when applying, for example, the tape 84 to a side of the battery cells 64, the battery cells 64 can be tipped so that the tape 84 is applied in a way that extends the tape 84 from a vertical bottom at a first axial end of the battery cells 64 to a vertical top at an opposite axial end of the battery cells 64. Angling the tape 84 in this way could help to withstand torsional loading of the battery array 18.

After the tape 84 has wound about the battery cells 64 enough times to provide a desired thickness for the compression assembly 76 of FIG. 3. The compression assembly 76 is permitted time to cure while the fixture 92 continues to compress the battery cells 64 between the plates 68, 72. After curing, the tape can hold the axial position of the plates 68, 72. The fixture 92 can then be decoupled from the plates 68, 72. The battery cells 64 and the compression assembly 76 can then be positioned atop the base 78.

Figure 9:
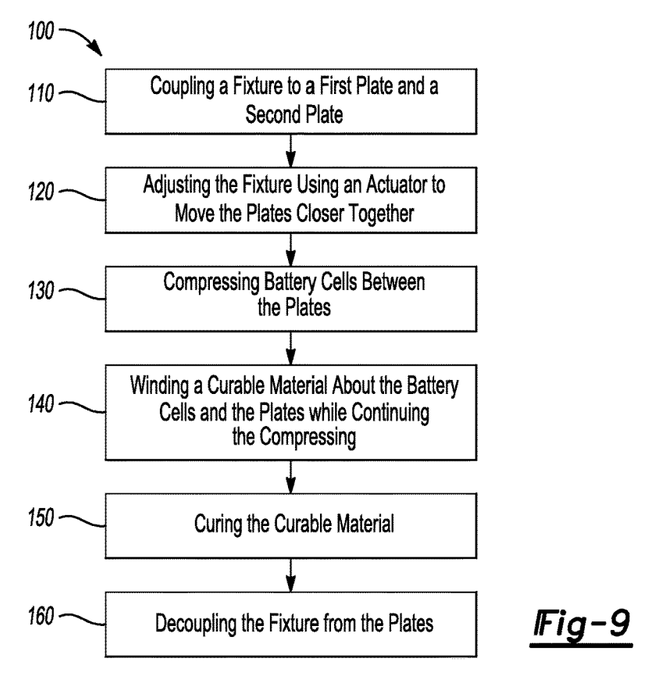
FIG. 9 shows the flow of an exemplary method for winding a curable material around the battery cells of FIG. 7.

Referring now to FIG. 9, an exemplary method 100 of incorporating a compression assembly into a battery array includes a step 110 of coupling a fixture to a first plate and a second plate. Then, at a step 120, the fixture is adjusted using an actuator to move the plates closer together. At the step 130, battery cells are compressed between the plates that are moving closer together.

Next, at a step 140, a curable material is wound about the battery cells and the plates while the fixture continues to compress the battery cells between the plates. At a step 150, the curable material cures while the fixture continues to compress the battery cells between the plates. Next, at a step 160, the fixture decouples from the plates. At this point, the curable material, which has now cured, can sufficiently hold the battery cells in the compressed position.

Figure 10:
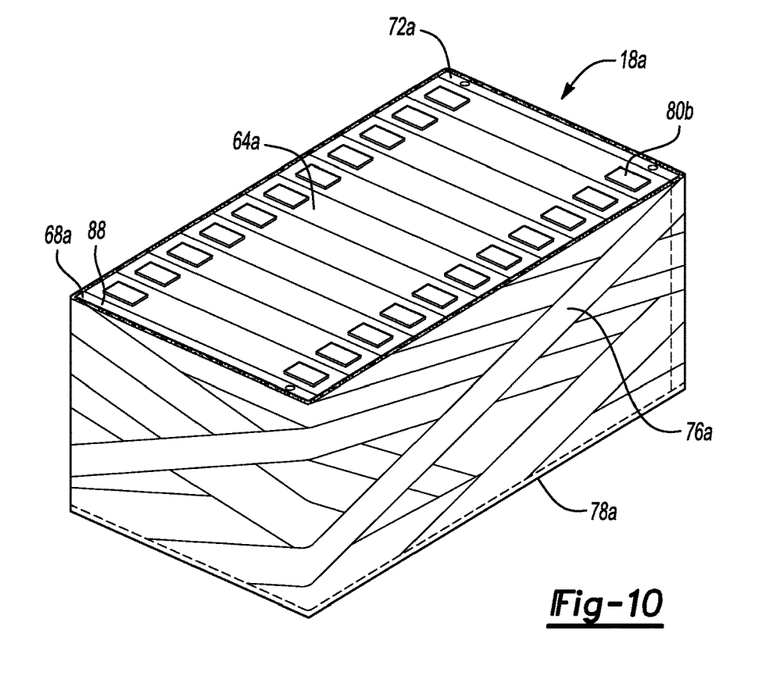
FIG. 10 shows a battery array incorporating a compression assembly as a curable material according to another exemplary embodiment.

Referring now to FIG. 10, another exemplary battery array 18a suitable for use within the traction battery pack 14 of FIG. 1 includes a compression assembly 76a similar in design to the compression assembly of FIG. 3 in that the compression assembly 76a is formed of a curable material. In the compression assembly 76a, the curable material has been wound around the base 78a, as well as plates 68a and 72a, and battery cells 64a.

The compression assembly 76a holds the base 78a relative to the battery cells 64a, in addition to holding the axial position of the plates 68a and 72a.

Since the compression assembly 76a includes winding about the base 78a, a fixture compressing the battery cells 64a during the winding can, for example, engage bores 88a opening to an upwardly facing surface of the plates 68a and 72a. Coupling such a fixture to this side of the plate 68a and 78a can avoid the fixture interfering with the winding of the curable material about the base 78a.

In other examples, the curable material of the compression assembly 76a could additionally, or instead, be wound about the surfaces of the battery cells 64a incorporating the terminals 80b. These surfaces are vertically top surfaces in this example. The curable material could be wound in a way that avoids covering the terminals 80b. Alternatively, the curable material could be cut away to reveal the terminals 80b after the curable material has cured. Covering the vertically top surfaces of the battery cells 64a can help to electrically isolate the battery cells 64a.

Figure 11:
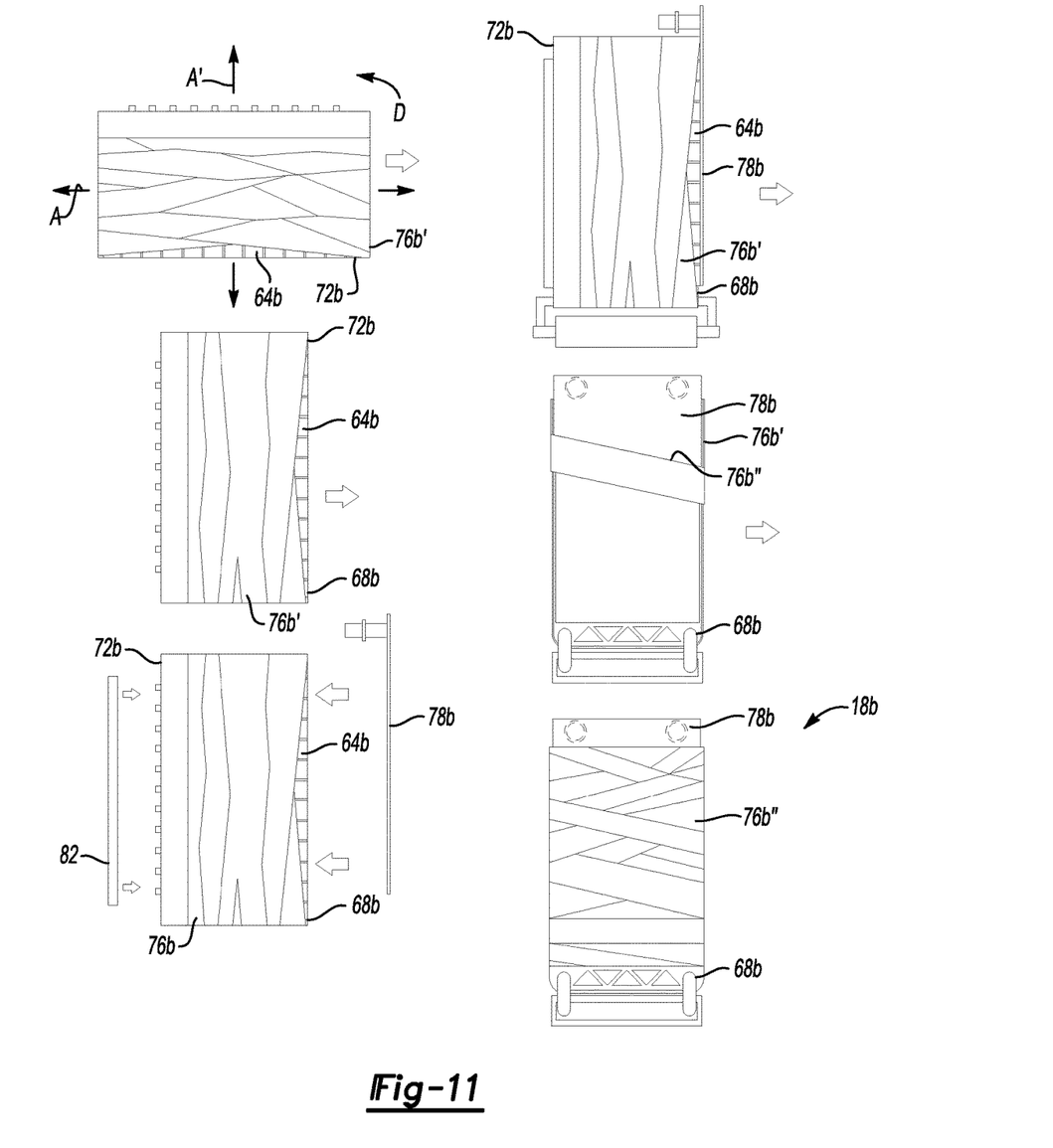
FIG. 11 shows exemplary steps in the process of winding a curable material about the plates and the battery cells according to still another exemplary embodiment.

Referring to FIG. 11, another exemplary battery array 18b suitable for use within the traction battery pack 14 of FIG. 1 includes a compression assembly 76b similar in design to the compression assembly of FIG. 3 in that the compression assembly 76b is formed of a curable material. In the compression assembly 76b, the curable material has been wound around the base 78b, a busbar assembly 82 or module, as well as plates 68b, 72b, and battery cells 64b.

The compression assembly 76b includes a first assembly 76b' and a second assembly 76b". The first assembly 76b' represents a first amount of a curable material, and the second assembly 76b" represents a second amount of a curable material.

The first assembly 76b' is wound around the plates 68b, 72b, and battery cells 64b. The first assembly 76b' is wound about an axis A', which is transverse to the axis A. Again, the battery cells 64b are distributed along the axis A. In this example, the axis A' is transverse to the axis A.

The first assembly 76b' is then permitted to fully cure or partially cure. A fixture, such as the fixture 92 (FIGS. 6 and 7) holding the plates 68b, 72b can then be decoupled.

Next, the plates 68b and 72b, and the battery cells 64b are tipped up in a direction D, and devices, such as the base 78b and the busbar assembly 82 are positioned against the battery cells 64b. The base 78b is a thermal exchange plate, in this example. The base 78b includes coolant ports.

The second assembly 76b" is then wound around the battery cells 64b, the base 78b, and the busbar assembly 82. The second assembly 76b" is wound about the axis A, which is perpendicular to the axis A'. The second assembly 76b", when cured, holds the devices relative to the battery cells 64b.

A fixture 92b can engage the plate 68b to rotate the battery cells 64b about the axis A. The curable material could move about the battery cells 64b in another example.

The compression assembly 76b holds the base 78b relative to the battery cells 64b, in addition to holding the axial position of the plates 68b and 72b.

In some examples, the second assembly 76b" is applied when the first assembly 76b' is partially cured, which can facilitate bonding the second assembly 76b" to the first assembly 76b'.

In some examples, the spacing of the second assembly 76b" from the battery cells 64b can provide a vent chamber used to communicate a fluid from the battery cells 64b during a venting event. The busbar assembly 82 can block movement of the second assembly 76b" against the battery cells 64b to provide the vent chamber, for example.

Features of the disclosed examples include a compression assembly of a curable material. The compression assembly can provide, among other things, sidewalls and endwalls of a battery array. The compression assembly can reduce an overall size of the array since fasteners and tensioning rods and other bracing features are not required.

The plate size can also be reduced since the plates, among other things, do not interface with bracing features like tensioning rods. The plates are subject to the distributed loads of the compression assembly, but not the more focused point loads of such bracing features.

The high tensile strength to weight ratio for the curable material verses, for example, steel, can permit the thickness of the compression assembly to be less than a steel sidewall providing protection and support.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method, comprising:
   winding a curable material at least partially about a plurality of battery cells that are compressed by a fixture.

2. The method of claim 1, further comprising, after the curable material has cured, holding the plurality of battery cells in a compressed position using the curable material rather than the fixture.

3. The method of claim 1, further comprising winding the curable material about an entire circumferential perimeter of the plurality of battery cells.

4. The method of claim 1, further comprising compressing the plurality of battery cells prior to the winding by moving a first plate toward a second plate using the fixture, the plurality of battery cells positioned between the first and second plates.

5. The method of claim 4, wherein the fixture is coupled to the first and the second plate when the fixture is compressing the plurality of battery cells, and is decoupled from the first plate and the second plate after the curable material has cured.

6. The method of claim 4, wherein the fixture is coupled to respective coupling surfaces of the first and the second plate when the fixture is coupled to the first and the second plate, and the winding comprises winding the curable material about winding surfaces of the first and second plate, the winding surfaces transverse to the coupling surfaces.

7. The method of claim 1, further comprising using an actuator to adjust the fixture to a position where the plurality of battery cells are compressed by the fixture, and decoupling the fixture from the actuator while the plurality of battery cells are compressed by the fixture.

8. The method of claim 1, wherein the curable material is a fiber-reinforced polymer-based tape.

9. The method of claim 1, wherein the winding comprises winding the curable material at least three times about a perimeter of the plurality of battery cells.

10. The method of claim 1, wherein the winding comprises winding the curable material about the plurality of battery cells and about a thermal exchange plate such that the curable material holds the thermal exchange plate relative to the plurality of battery cells after the curable material has cured.

11. The method of claim 1, wherein the plurality of battery cells are part of a traction battery pack.

12. The method of claim 1, wherein the winding comprising rotating the plurality of battery cells relative to the curable material.

13. The method of claim 1, wherein the curable material is cured after the winding.

14. The method of claim 1, wherein a first amount of the curable material is wound about the battery cells to compress the battery cells between first and second plates, and a second amount of the curable material is wound about the battery cells to hold a device relative to the battery cells, the first amount of material wound about a first axis, the second amount of material wound about a second axis transverse to the first axis.

15. An assembly, comprising:
a plurality of battery cells compressed by a fixture; and
a curable material wound around the plurality of battery cells.

16. The assembly of claim 15, further comprising a first plate and a second plate, the fixture coupled to the first and second plates to compress the plurality of battery cells between the first and second plates.

17. The assembly of claim 16, wherein the first plate and the second plate are a polymer-based material.

18. The assembly of claim 15, wherein the plurality of battery cells are part of a traction battery pack.

19. An assembly, comprising:
a plurality of battery cells compressed by a fixture; and
a curable material wound around the plurality of battery cells, the curable material is a tape that is fiber-reinforced and polymer-based.

20. The assembly of claim 19, wherein the curable material comprises at least one layer of the tape.

* * * * *